US009026649B2

(12) United States Patent
Delos Reyes et al.

(10) Patent No.: US 9,026,649 B2
(45) Date of Patent: May 5, 2015

(54) DETERMINING PRESENCE STATUS BASED ON USER ANALYTICS DATA

(75) Inventors: Emerando M. Delos Reyes, Pleasant Hill, CA (US); Benjamin J. Parker, Foster City, CA (US); Samir Ait-Ameur, Fremont, CA (US); Deepak Kakadia, Union City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 185 days.

(21) Appl. No.: 13/567,453

(22) Filed: Aug. 6, 2012

(65) Prior Publication Data
US 2014/0040345 A1   Feb. 6, 2014

(51) Int. Cl.
G06F 15/173   (2006.01)
G06Q 30/00   (2012.01)
H04L 29/08   (2006.01)

(52) U.S. Cl.
CPC .............. H04L 67/24 (2013.01); G06Q 30/00 (2013.01); *H04L 67/18* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 6,618,593 | B1 * | 9/2003 | Drutman et al. | 455/456.3 |
| 8,193,934 | B2 * | 6/2012 | Agulnik et al. | 340/541 |
| 2004/0205175 | A1 * | 10/2004 | Kammerer | 709/223 |
| 2005/0068167 | A1 * | 3/2005 | Boyer et al. | 340/531 |
| 2005/0187781 | A1 * | 8/2005 | Christensen | 705/1 |
| 2008/0228929 | A1 * | 9/2008 | Kiss | 709/228 |
| 2009/0210536 | A1 * | 8/2009 | Allen et al. | 709/227 |
| 2009/0275314 | A1 * | 11/2009 | Cotevino et al. | 455/414.2 |
| 2011/0196925 | A1 * | 8/2011 | Hans et al. | 709/204 |
| 2012/0150974 | A1 * | 6/2012 | Jana et al. | 709/206 |

OTHER PUBLICATIONS

Horvitz, Eric; "Models of Attention in Computing and Communication: From Principles to Applications" (Communications of the ACM, Mar. 2003, vol. 46, No. 3, pp. 53-59).*
Waiting, David; "The UCT IMS Client" (White Paper, University of Cape Town, Rondebosch, South Africa, 2009).*

* cited by examiner

*Primary Examiner* — Mohamed Ibrahim
*Assistant Examiner* — James Fiorillo (57) ABSTRACT

A first server is configured to receive data associated with a first user device. The first user device may send the data to the first server via a network device without user interaction, and the data may relate to activity associated with the first user device. The first server is further configured to determine a status, associated with the first user device, based on the data, store information regarding the status, receive permissions for the information regarding the status of the first user device, apply the permissions for the information regarding the status to form an advertised status, and send the advertised status to the network device. The network device may be capable of sending the advertised status to a client device or a second user device based on the permissions.

21 Claims, 10 Drawing Sheets

| User Device Information | | | Advertising permissions | | |
|---|---|---|---|---|---|
| MDN | IMSI | | Idle | On Call | Geographic Location |
| 357932004521 4 | 404685505601234 | | All devices | UD-1, UD-2 | UD-1 |
| 359365004521 5 | 310150123456789 | | UD-3, UD-4, UD-5 | UD-3, UD-4, UD-5 | UD-3, UD-4, UD-5 |
| 352272014521 8 | 460001234567890 | | UD-6 | UD-6 | No devices |
| 357070004521 3 | 460001234567891 | | All devices | All devices | All devices |
| 359732004521 6 | 310150123458741 | | All devices | UD-7 | UD-8 |

DETERMINING PRESENCE STATUS BASED ON USER ANALYTICS DATA

BACKGROUND

Users sometimes use user devices to advertise a status (e.g., a "busy" status an "available" status, or some other status) associated with the user of the user device. Advertising a status may require manual user interaction with the user device, and may allow unauthorized devices to identify the status associated with the user device.

DETAILED DESCRIPTION OF THE PREFERRED EMBODIMENTS

The following detailed description refers to the accompanying drawings. The same reference numbers in different drawings may identify the same or similar elements.

Systems and/or methods, described herein, may determine presence status, associated with a user device, based on user analytics data of the user device. In some implementations, a network device, such as a gateway, associated with a network, may receive user analytics data for a user device, such as user device identifiers, user device geographic location (e.g., longitude and latitude coordinates), information associated with network sessions between the user device and a network, call activity information, user profile information for a user associated with the user device, etc.

The systems and/or methods may include a presence server to receive user analytics data from the network device and determine presence status for the user device based on the user analytics data. In some implementations, presence status may relate to an application of user analytics data. In one example implementation, the presence server may determine presence status relating to when the user device is on a call (e.g., based on user analytics data relating to call activity). In some other implementation, the presence server may determine presence status relating to when the user device is at a particular geographic location (e.g., based on user analytics data relating to geographic location data).

In some implementations, presence status, associated with a user device, may be advertised over a network (e.g., via the network device), based on permissions to advertise the presence status. For example, a permissions server may receive the presence status, and may store advertising permissions for different applications (e.g., presence status types) associated with presence data for a user device. Additionally, the permissions server may send presence status for a user device to a network device based on identifying that the presence status is permitted to be advertised.

In one example implementation, the permission server may send presence status relating to when a user device is on a call, but may not send presence status relating to the geographic location of the user device (e.g., based on permissions to advertise call status presence status, but not to advertise geographic location information). In some other implementations, the permission server may apply permissions to the presence status to form advertised presence status such that some devices may receive the advertised presence status while other devices may not receive the advertised presence status.

In some implementations, a client device may receive presence status, associated with a user device, based on the presence status being received by a network device and/or based on permissions of the presence status to authorize the client device to receive the presence status. In one example implementation, a client device (e.g., a server) may automatically receive presence status relating to when the user device is at a particular geographic location. Additionally, the client device may send information, associated with the geographic location (e.g., promotions for a merchant, associated with the geographic location, and/or some other information associated with the geographic location).

In another example implementation, the client device may request presence status for a user device (e.g., to identify if the user device is currently being used to browse the internet and/or the type of user device) for some other purpose (e.g., to send the user device information associated with websites being accessed by the user device in a format appropriate for the type of user device).

In some other implementation, a first user device may request presence status associated with a second user device. For example, the first user device may request presence status of the second user device to identify if the second user device is currently associated with a "busy" presence status based on user analytics relating to when the second user device is placing a call, when a user, associated with the second user device, has an event scheduled in the user's calendar, etc. Additionally, or alternatively, the first user device may automatically receive presence status relating to when the second user device is no longer associated with a "busy" presence status.

Figure 1:
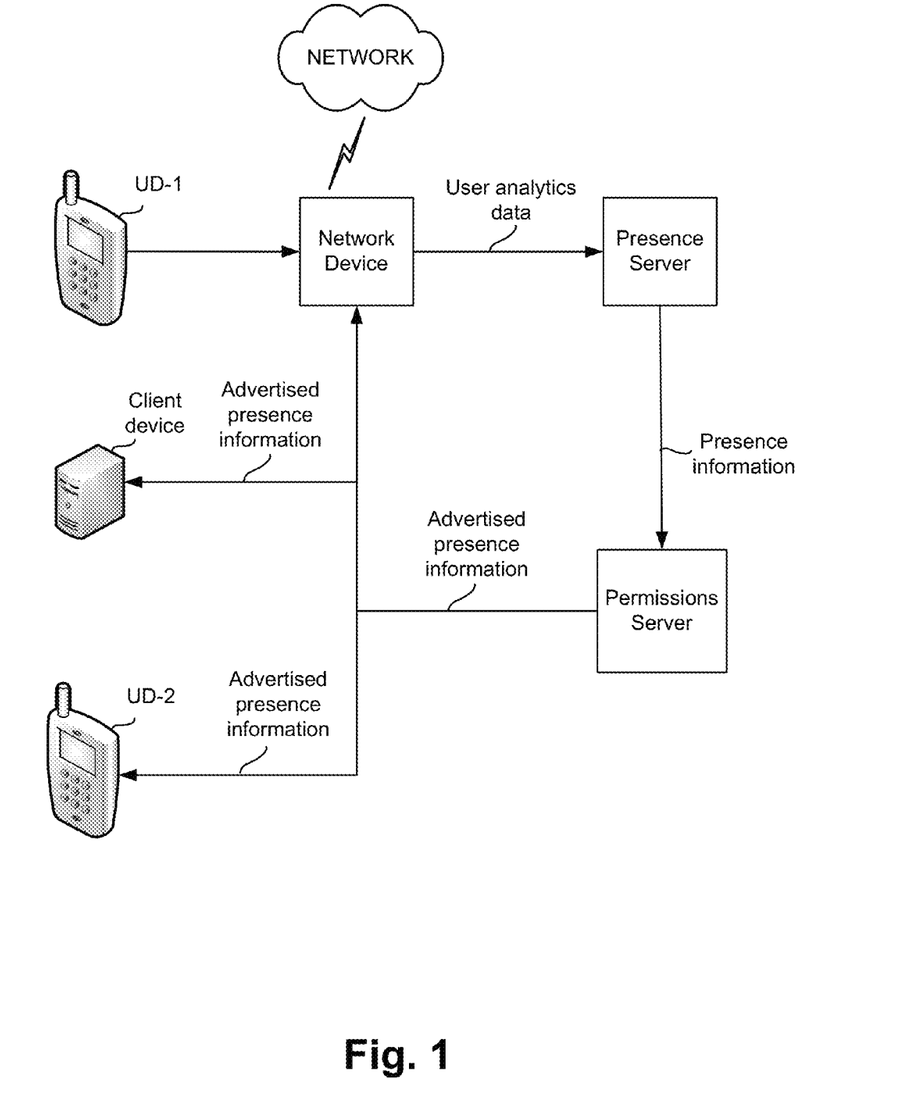
FIG. 1 illustrates an example overview of an implementation described herein.

FIG. 1 illustrates an example overview of an implementation described herein. As shown in FIG. 1, a first user device (referred to as "UD-1") may communicate with a network via a network device. As described above, the network device may receive user analytics data for UD-1, such as user device identifiers, user device geographic location information (e.g., longitude and latitude coordinates), information associated with network sessions between UD-1 and the network, call activity information, user profile information for a user associated with UD-1, etc.

As further shown in FIG. 1, a presence server may receive user analytics data from the network device and determine presence status for UD-1 based on the user analytics data. Additionally, a permissions server may receive the presence status, from the presence server, and may send advertised presence status to the network (e.g., via the network device), based on the received presence status and based on permissions information stored by the permissions server.

In some implementations, a client device may receive advertised presence status from the network (e.g., via the network device). In some implementations, the network device may automatically send advertised presence status to the client device based on some algorithm (e.g., based on UD-1 entering a particular geographic region, time of day, day of week, occurrence of an event, and/or some other algorithm). Additionally, or alternatively, the client device may request advertised presence status from the network device to receive the advertised presence status. In some implementations, a second user device (referred to as "UD-2"), may automatically receive advertised presence status, associated with UD-1, based on some algorithm (e.g., based on advertised presence status relating to when the UD-1 is not busy). Additionally, or alternatively, UD-2 may request advertised presence status associated with UD-1 network device to receive the advertised presence status.

As a result, presence status may be automatically determined for UD-1 without user interaction. Additionally, only permitted presence status may be advertised such that the client device and/or UD-2 may receive only permitted presence status defined by a user and/or some other party associated with UD-1.

While some example implementations of presence status are described (e.g., sending a client device information when a user device enters a particular geographic location, notifying a first user device when a second user device is no longer busy, etc.), the systems and/or methods are not so limited. For example, presence status may be used for implementations not described and are not limited to the implementations described herein.

Figure 2:
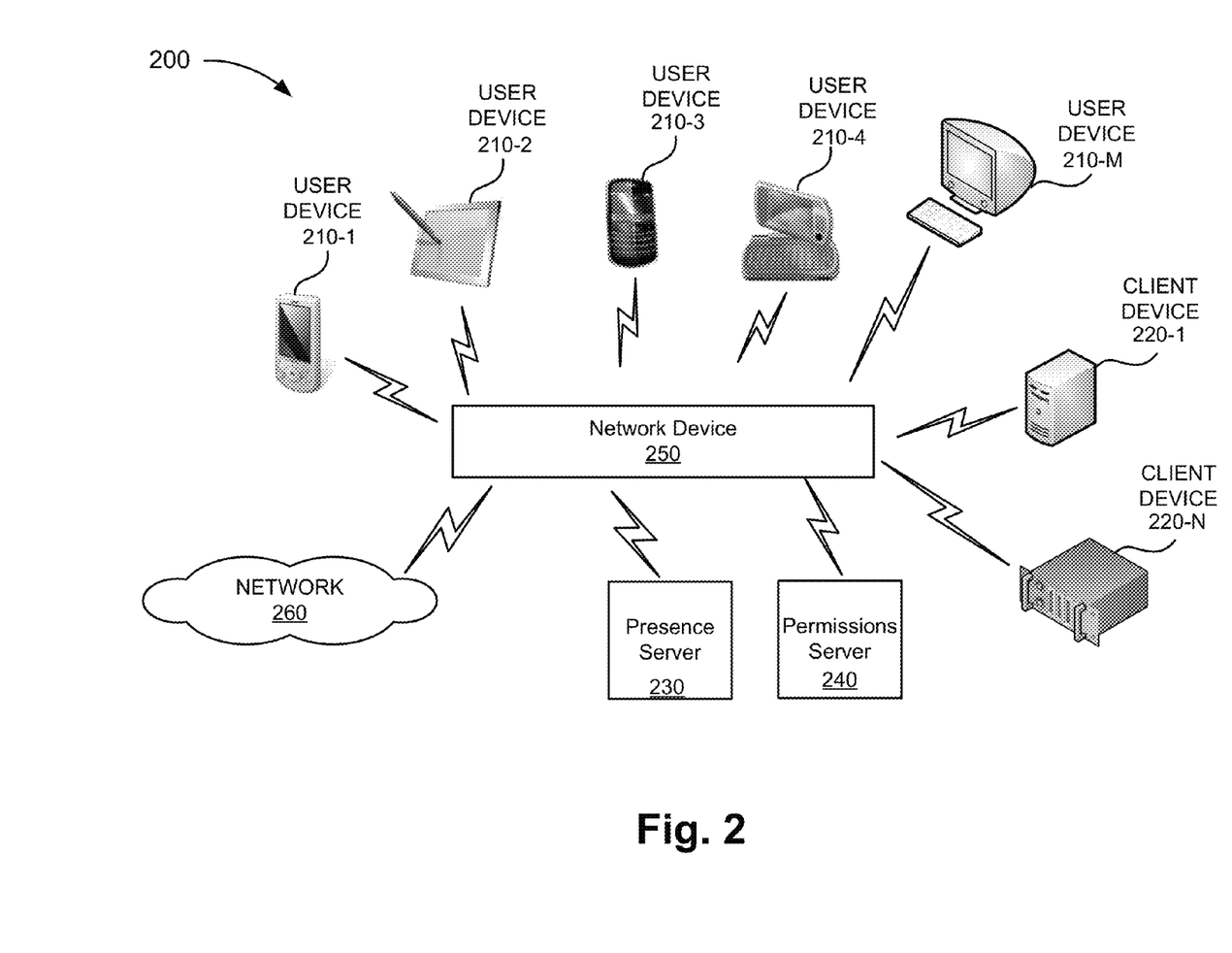
FIG. 2 illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include user devices 210-1, 210-2, ..., 210-M (where M≥1) (collectively referred to as "user devices 210," and individually as "user device 210"), client devices 220-1 ... 220-N (where N≥1) (collectively referred to as "client devices 220," and individually as "client device 220"), presence server 230, permissions server 240, network device 250 and/or network 260. While FIG. 2 shows a particular quantity and arrangement of devices, in practice, environment 200 may include additional devices, fewer devices, different devices, or differently arranged devices than are shown in FIG. 2. For example, each of servers 230 and 240 may be implemented as multiple, possibly distributed, devices. Alternatively, servers 230 and 240 may be implemented within a single device. Further, a function described as being performed by one server may be performed by another server or a user device.

User device 210 may include any portable or non-portable device capable of communicating via a network, such as network 260. For example, user device 210 may correspond to a mobile communication device (e.g., a smart phone or a personal digital assistant (PDA)), a portable computer device (e.g., a laptop or a tablet computer), a non-portable computer device (e.g., a personal computer), a gaming device, a set-top box, or another type of device. In some implementations, user device 210 may send user analytics data to network device 250 based on performing some task (e.g., placing or receiving a telephone call, browsing the internet, sending an electronic message (e-mail), sending a secure message service (SMS) message, etc.). In some implementations, a first user device 210 may receive advertised presence status associated with a second user device 210.

Client device 220 may include a computing device, such as a desktop server, a desktop computer, a rack-mountable server, or a collection of devices. In some implementations, client device 220 may receive presence status, associated with user device 210, and may send information to user device 210 based on the presence status. For example, in one implementation, client device 220 may receive presence status, associated with user device 210, when user device 210 enters a particular geographic location. Client device 220 may send information to user device 210 (e.g., promotions for a merchant, associated with the geographic location), based on receiving the presence status. In some implementations, client device 220 may automatically receive presence status, or may request presence status from network device 250.

Presence server 230 may include a computing device, such as a server device or a collection of server devices. In some implementations, presence server 230 may receive user analytics data, associated with user device 210, from network device 250. Additionally, presence server 230 may determine presence status, associated with user device 210, based on the user analytics data. For example, presence server 230 may determine presence status relating to when the user device is on a call (e.g., based on user analytics data relating to call activity). In some other implementation, presence server 230 may determine presence status relating to when the user device is at a particular geographic location (e.g., based on user analytics data relating to geographic location data).

Permissions server 240 may include a computing device, such as a server device or a collection of server devices. In some implementations, permissions server 240 may store permissions information, associated with user device 210, to identify presence status which may be permitted to be advertised to network device 250. For example, permissions server 240 may store information to allow presence status (e.g., a "busy" status) to be advertised and may store information to prevent unauthorized presence status from being advertised (e.g., presence status relating to a current geographic location, associated with user device 210). In some implementations, permissions server 240 may receive permissions information from corresponding user devices 210 (e.g., by a user associated with user device 210). Additionally, the permissions information may change at any time based on receiving updated permissions information from user device 210.

In some implementations, permissions server 240 may store permissions information that indicates that particular user devices 210 and/or client devices 220 may receive some presence status, while other user devices 210 and/or client devices 220 may receive some other presence status. For example, permissions server 240 may store permissions information that permits a first user device 210 to receive presence status relating to a current geographic location associated with a second user device 210, and prevents a third user device 210 from receiving presence status relating to a current geographic location associated with the second user device 210.

In some implementations, permissions server 240 may receive presence status, associated with user device 210, from presence server 230, and may apply permission rules associated with the presence status (e.g., permissions to identify which user devices 210 and/or client devices 220 may receive presence status information relating to a particular user device 210). In some implementations, permissions server 240 may form advertised presence status information based on applying permission rules to the presence status. In some implementations, the permission rules, associated with the presence status, may include an instruction to permit transmission of the advertised presence status to an authorized device (e.g., a particular user device 210 and/or client device 220) and to prevent transmission of the advertised presence status to a device which is not authorized.

Additionally, permissions server 240 may send advertised presence status (e.g., presence status with permissions applied by permissions server 240) to network device 250 based on permissions information stored by permissions server 240. Additionally, or alternatively, permissions server 240 may prevent presence status to be sent to network device 250 and may prevent presence status to be accessible by user device 210 and/or client device 220 based on permissions information stored by permissions server 240.

In one implementation, the interactions between or with presence server 230 and permissions server 240 may be performed using the hypertext transfer protocol (HTTP) or the secure HTTP (HTTPS). In one implementation, the interactions between or with presence server 230 and permissions server 240 may be performed using another type of protocol.

Network device 250 may include a network device, a data processing and/or data transfer device, or a collection of data processing and/or data transfer devices. In some implementations, network device 250 may include a gateway (e.g., a packet data network (PDN) network device (PGW)), a router, a modem, a switch, a firewall, a NIC, a hub, a bridge, a proxy server, a base station, an access point, or some other type of device that processes and/or transfers data. Network device 250 may, for example, provide connectivity of user device 210 to external packet data networks by being a data exit/entry point for user device 210. Network device 250 may perform policy enforcement, packet filtering, charging support, lawful intercept, and/or packet screening. Network device 250 may also function as an anchor for mobility between 3GPP and non-3GPP technologies. In some implementations, network device 250 may include a device to receive user analytics data, associated with user device 210, such as user device identifiers, user device geographic location information (e.g., longitude and latitude coordinates), information associated with network sessions between user device 210 and network 260, call activity information, user profile information for a user associated with user device 210, etc.

Network 260 may include any type of network or a combination of networks. For example, network 260 may include a local area network (LAN), a wireless LAN (WLAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), a fiber optic, or a combination of networks. Each of user device 210, client device 220, presence server 230, and/or permissions server 240 may connect to network 260 via a wireless connection, a wired connection, or a combination thereof.

Figure 3:
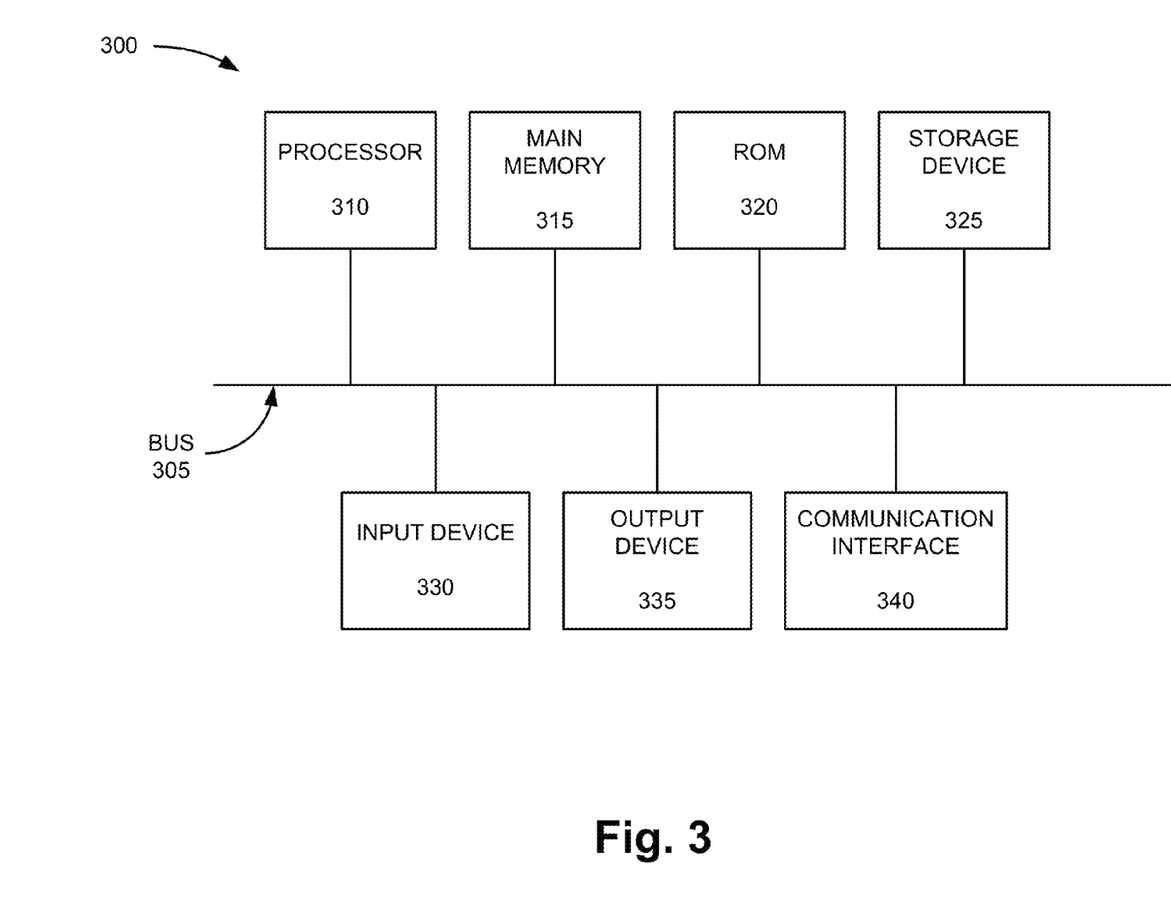
FIG. 3 illustrates example components of a device that may be used within the environment of FIG. 2.

FIG. 3 illustrates example components of a device 300 that may be used within environment 200 of FIG. 2. Device 300 may correspond to user device 210, client device 220 presence server 230, permissions server 240, and/or network device 250. Each of user device 210 client device 220 presence server 230, permissions server 240, and/or network device 250 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
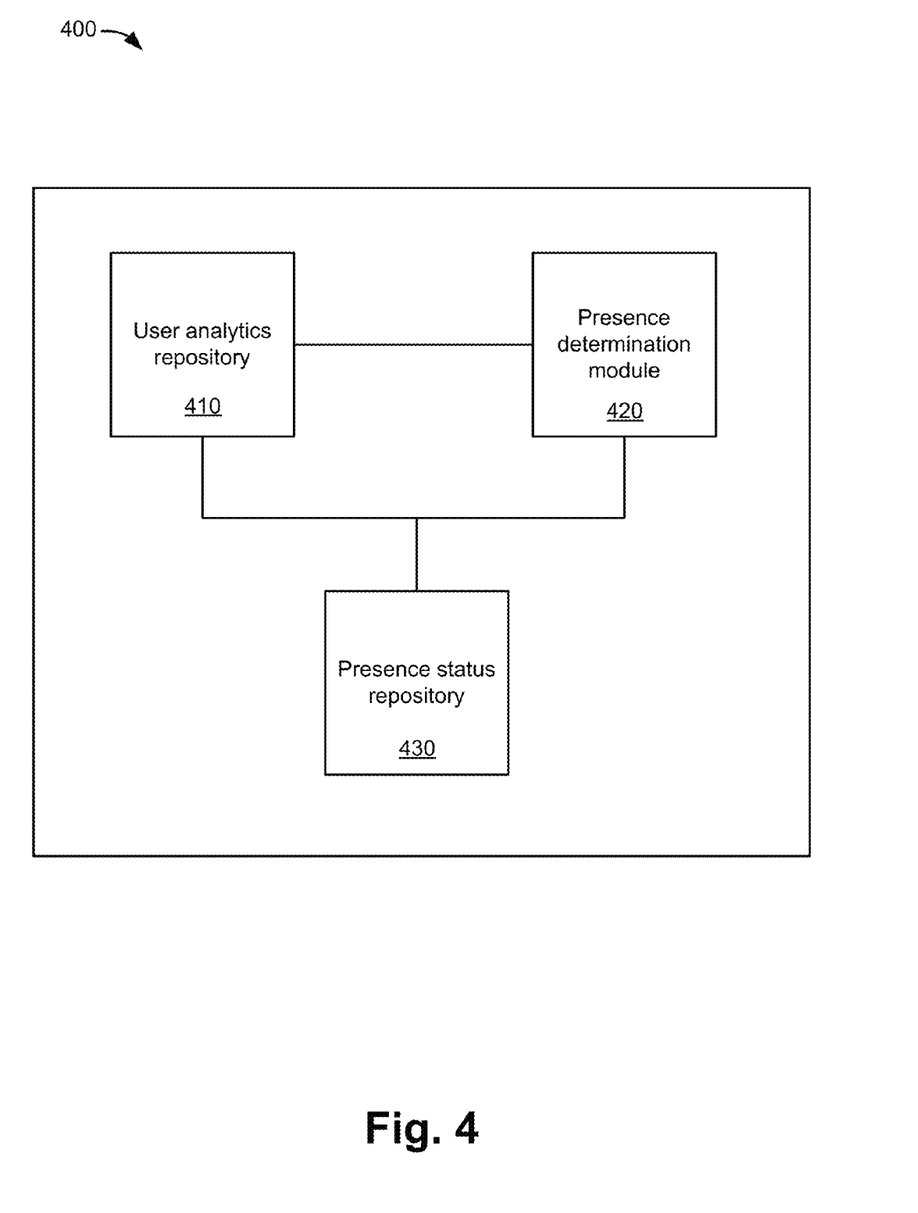
FIG. 4 illustrates example functional components of an example system.

FIG. 4 illustrates example functional components of an example system 400. In some implementations, system 400 may include functional components implemented by a device, such as presence server 230. In some other implementations, system 400 may include functional components implemented by one or more devices, which include or exclude presence server 230. For example, permissions server 240 may include some or all of the functional components of system 400.

As shown in FIG. 4, system 400 may include user analytics repository 410, presence determination module 420, and presence status repository 430.

In some implementations, user analytics repository 410 may receive and/or store user analytics data from network device 250. For example, as described above, network device 250 may receive user analytics data from user device 210, such as user device identifiers, user device geographic location information (e.g., longitude and latitude coordinates), information associated with network sessions between user device 210 and network 260, call activity information, user profile information for a user associated with user device 210, etc. Network device 250 may provide user analytics data to user analytics repository 410 based on receiving user analytics data from user device 210.

Presence determination module 420 may determine presence status, associated with user device 210, based on information stored by user analytics repository 410. For example, presence determination module 420 may determine presence status relating to when user device 210 is on a call (e.g., based on user analytics data relating to call activity). In some other implementation, presence determination module 420 may determine presence status relating to when user device 210 is at a particular geographic location (e.g., based on user analytics data relating to geographic location data).

In some other implementation, presence determination module 420 may determine presence status relating to when user device 210 is considered to be unavailable (e.g., based on user analytics data relating to information stored by a calendar application associated with user device 210). In another implementation, presence determination module 420 may determine presence status relating to when user device 210 is in a "driving" status (e.g., based on user analytics data relating to geographic location data, which may demonstrate that user device 210 is moving at a speed greater than a threshold). In another implementation, presence determination module 420 may determine presence status relating to some other status or activity associated with user device 210.

Presence status repository 430 may receive and/or store information associated with presence status for user device 210. For example, presence status repository 430 may receive and/or store a presence status, associated with user device 210, based on presence determination module 420 determining presence status associated with user device 210. In some implementations, presence status repository 430 may store multiple presence statuses for user device 210, and may change the presence status for user device 210 based on receiving an updated presence status from presence determination module 420. For example, presence status repository 430 may store a presence status relating to when user device 210 is considered to be unavailable and may update the presence status relating to when user device 210 is considered to available based on receiving a presence status update from presence determination module 420 indicating that user device 210 is available.

Figure 5:
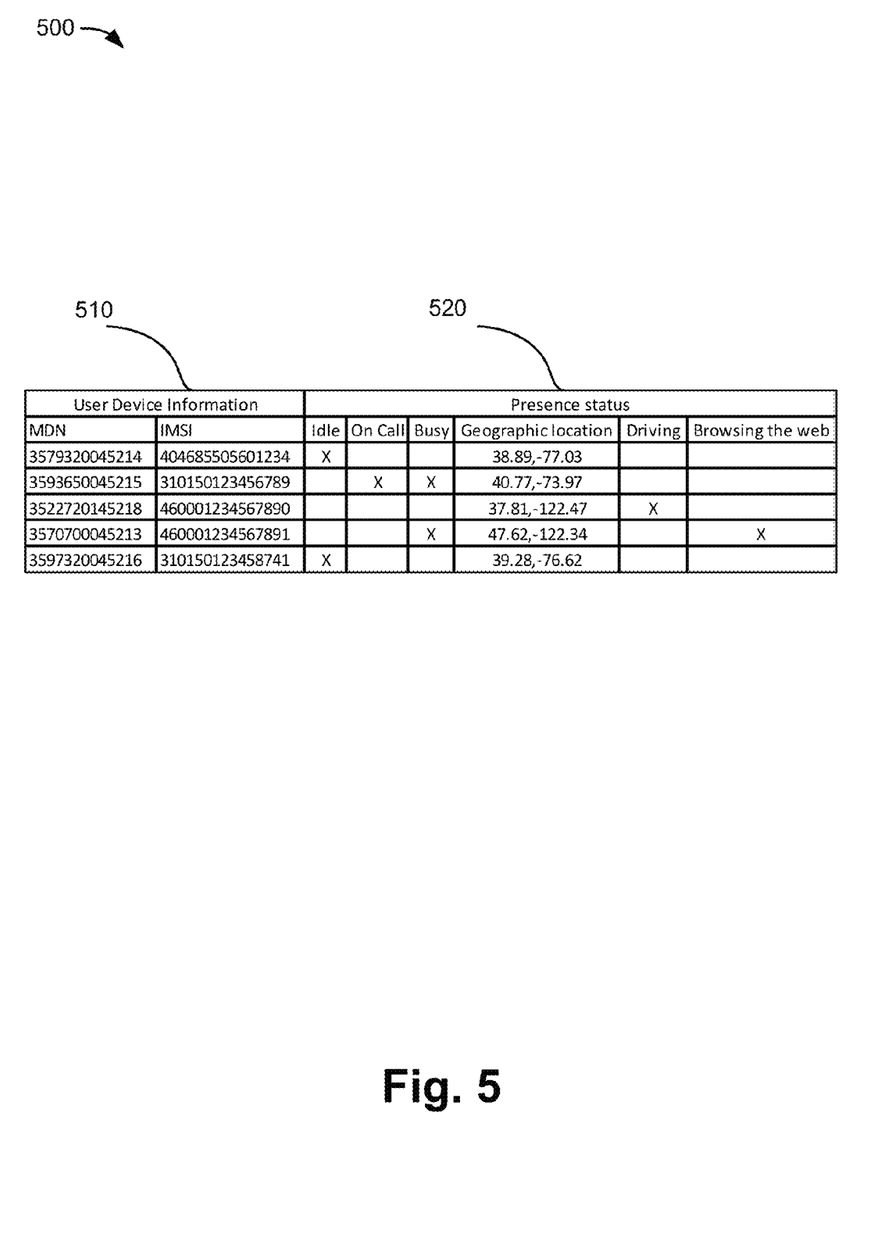
FIG. 5 illustrates an example data structure that may be stored by one or more servers, such as a presence server.

FIG. 5 illustrates an example data structure 500 that may be stored by one or more servers, such as presence server 230. In one implementation, data structure 500 may be stored in a memory of presence server 230. In another implementation, data structure 500 may be stored in a memory separate from, but accessible by, presence server 230. For example, data structure 500 may be stored by permissions server 240 and/or network device 250. Each entry, associated with data structure 500, may correspond to presence status for a particular user device 210. A particular instance of data structure 500 may contain different information and/or fields than another instance of data structure 500.

As shown in FIG. 5, data structure 500 may include user device information field 510 and presence status field 520. In some implementations, data structure 500 may include additional fields, fewer fields, different fields, or differently arranged fields than are shown in FIG. 5.

User device information field 510 may store information to identify a particular user device 210 having presence status information. In some implementations, user device information field 510 may store information, such as a mobile device number (MDN), an international mobile subscriber identity (IMSI) number, and/or some other identifier. While a particular format of information stored by user device information field 510 is shown in FIG. 5, in practice, user device information field 510 may store information for a particular user device 210 in any format.

Presence status field 520 may store information identifying one or more presence statuses for a particular user device 210. For example, presence status field 520 may store information identifying a presence status and may correspond to information stored by presence status repository 430. Presence status field 520 may store presence status types, such as "idle," "on call," "busy," "geographic location," "driving," "browsing the web," etc. Presence status field 520 may additionally store indicators (e.g., as shown by the character "X"), associated with a presence status type, to identify a presence status (e.g., "idle", "busy," etc.) associated with a particular user device 210. In some implementations, presence status field 520 may store longitude and latitude coordinates (e.g., in the context of the "geographic location" presence status type).

In one example implementation, presence status field may identify that the particular user device 210 having the MDN of "3579320045214" and "404685505601234" may be associated with a presence status of "idle" and may be associated with a presence status associated with longitude and latitude coordinates of "38.89, −77.03." As described above, presence status repository 430 may store a presence status for user device 210 based on presence determination module 420 receiving user analytics data.

Figure 6:
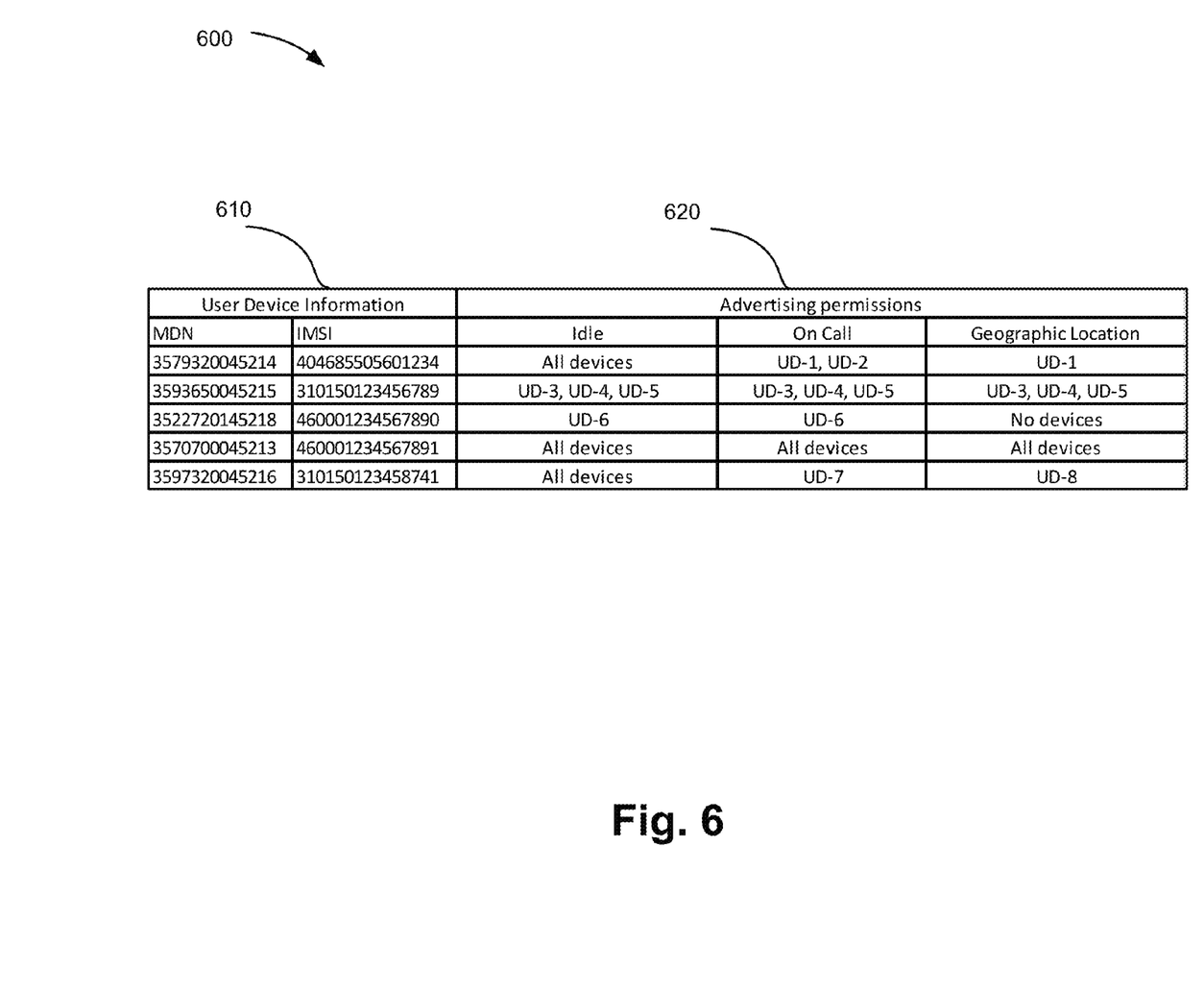
FIG. 6 illustrates an example data structure that may be stored by one or more servers, such as a permissions server.

FIG. 6 illustrates an example data structure 600 that may be stored by one or more servers, such as permissions server 240. In one implementation, data structure 600 may be stored in a memory of permissions server 240. In another implementation, data structure 600 may be stored in a memory separate from, but accessible by, permissions server 240. For example, data structure 600 may be stored by presence server 230 and/or network device 250. Each entry, associated with data structure 600, may correspond to advertising permissions information for a particular user device 210. A particular instance of data structure 600 may contain different information and/or fields than another instance of data structure 600.

As shown in FIG. 6, data structure 600 may include user device information field 610 and/or advertising permissions field 620. In some implementations, data structure 600 may include additional fields, fewer fields, different fields, or differently arranged fields than are shown in FIG. 6.

User device information field 610 may store information to identify a particular user device 210 having advertising permissions for a presence status type. In some implementations, user device information field 510 may store information, such as an MDN, an IMSI number, and/or some other identifier. While a particular format of information stored by user device information field 610 is shown in FIG. 6, in practice, user device information field 610 may store information for user device 210 in any format.

Advertising permissions field 620 may store information identifying permissions relating to user devices 210 and/or client devices 220 which may be permitted to receive presence status information associated with a particular user device 210. For example, as shown in FIG. 6, all devices (e.g., user devices 210 and/or client devices 220) may receive presence status associated with the particular user device 210 having the MDN "3579320045214" relating to the presence status type of "idle." That is, all devices (e.g., user devices 210 and/or client devices 220) may identify when the particular user device 210 having the MDN "3579320045214" is associated with the "idle" presence status type. In some other example implementations, only particular user devices 210 (e.g., UD-1 and UD-2) may receive presence status relating to the presence status type of "on call." In some other example implementations, no user devices 210 or client devices 220 may receive presence status relating to the presence status of the geographic location of user device 210 having the MDN "3522720145218." In some implementations, a user, associated with user device 210, may select advertising permissions to determine which user devices 210 and/or client devices 220 may receive presence status information for different presence status types.

Figure 7:
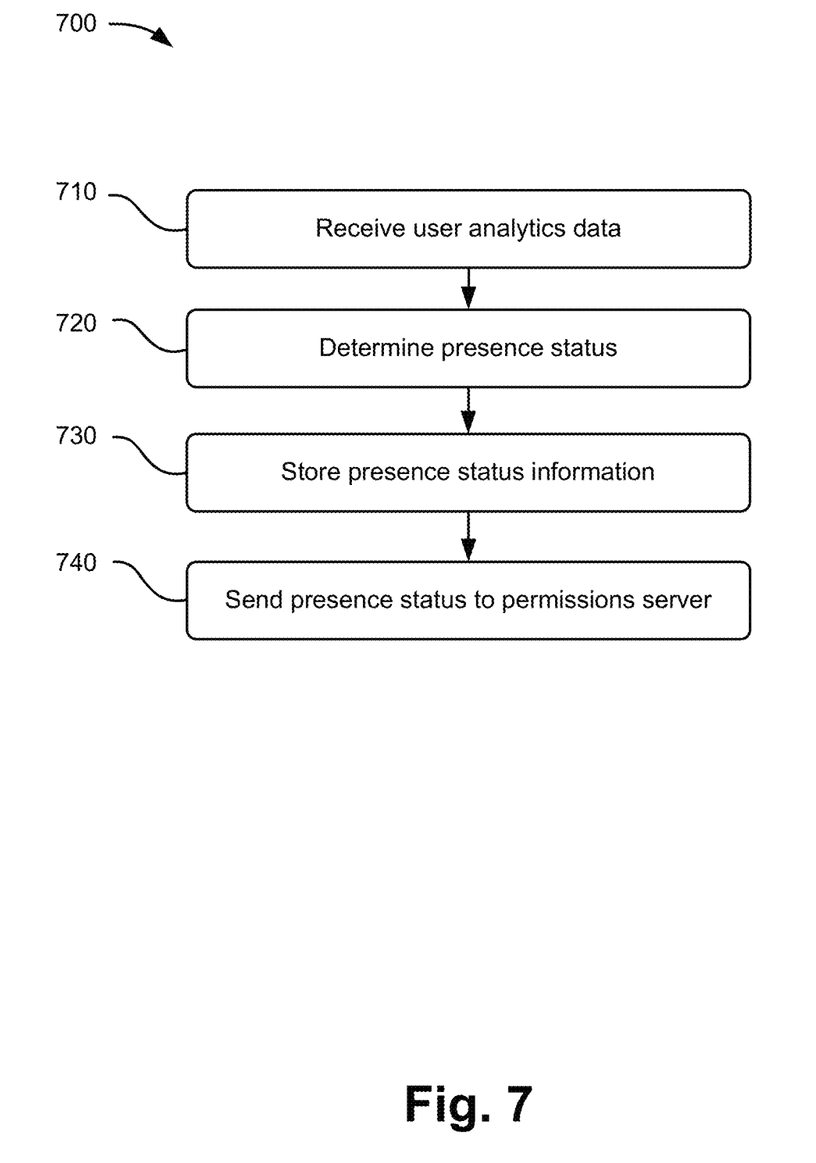
FIG. 7 illustrates a flowchart of an example process for determining user presence.

FIG. 7 illustrates a flowchart of an example process 700 for determining user presence. In one implementation, process 700 may be performed by one or more components of presence server 230, such as processor 310 of presence server 230. In another implementation, one or more blocks of process 700 may be performed by one or more components of another device (e.g., permissions server 240), or a group of devices including or excluding presence server 230.

Process 700 may include receiving user analytics data (block 710). For example, as described above with respect to user analytics repository 410, presence server 230 may receive and/or store user analytics data from network device 250. For example, as described above, network device 250 may receive user analytics data from user device 210, such as user device identifiers, user device geographic location information (e.g., longitude and latitude coordinates), information associated with network sessions between user device 210 and network 260, call activity information, user profile information for a user associated with user device 210, etc.

Process 700 may also include determining presence status (block 720). For example, as described above with respect to presence determination module 420, presence server 230 may determine presence status, associated with user device 210, based on information stored by user analytics repository 410. For example, presence server 230 may determine presence status relating to when user device 210 is on a call (e.g., based on user analytics data relating to call activity). In some other implementation, presence server 230 may determine presence status relating to when user device 210 is at a particular geographic location (e.g., based on user analytics data relating to geographic location data). Additionally, or alternatively, presence server 230 may determine presence status relating to some other activity, associated with user device 210.

Process 700 may further include storing presence status information (block 730). For example, as described above with respect to presence status repository 430, presence server 230 may receive and/or store information associated with presence status for user device 210. For example, presence server 230 may receive and/or store a presence status, associated with user device 210, based on presence determination module 420 determining the presence status associated with user device 210.

Process 700 may also include sending presence status to permissions server 240. For example, presence server 230 may send presence status to permissions server 240 using a secure protocol, (e.g., an HTTPS protocol) and/or some other type of protocol.

Figure 8:
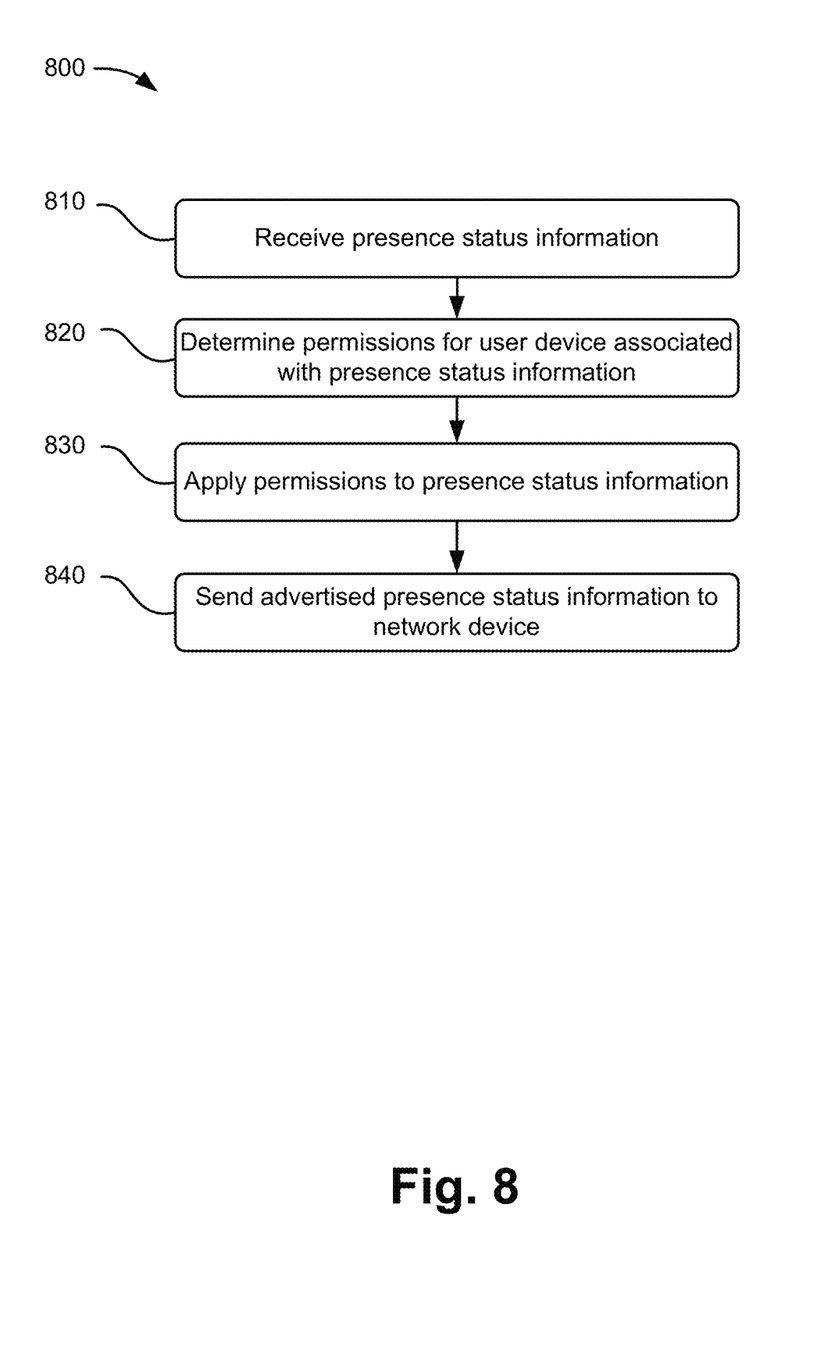
FIG. 8 illustrates a flowchart of an example process for advertising user presence.

FIG. 8 illustrates a flowchart of an example process 800 for advertising user presence. In one implementation, process 800 may be performed by one or more components of permissions server 240, such as processor 310 of permissions server 240. In another implementation, one or more blocks of process 800 may be performed by one or more components of another device (e.g., presence server 230), or a group of devices including or excluding permissions server 240.

Process 800 may include receiving presence status information (block 810). For example, as described above, permissions server 240 may receive presence status information from presence server 230 (e.g., via a secure protocol, such as an HTTPS protocol or some other type of protocol).

Process 800 may further include determining permissions for user device 210 associated with the presence status information (block 820). For example, permissions server 240 may determine permissions for user device 210 based on information stored by data structure 600. In some example implementation, permissions server 240 may determine that only particular user devices 210 (e.g., UD-3, UD-4, and UD-5) may receive presence status information relating to the "idle" presence status type for the user device 210 having the MDN "3593650045215."

Process 800 may also include applying permissions to the presence status information (block 830). For example, as described above, permissions server 240 may apply permissions associated with the presence status for user device 210 (e.g., permissions to identify which user devices 210 and/or client devices 220 may receive the presence status information). In some implementations, permissions server 240 may form advertised presence status information based on applying permissions to the presence status.

Process 800 may further include sending advertised presence status information to network device 250. For example, permissions server 240 may send advertised presence status information to network device 250 based on forming the advertised presence status information as described above. In some implementations, permissions server 240 may send advertised presence status information to network device 250 using a secure protocol, such as an HTTPS protocol and/or some other protocol. In some implementations, network device 250 may transmit the advertised presence status to permitted user devices 210 and/or client devices 220 based on the applied permissions associated with the advertised presence status.

Figure 9:
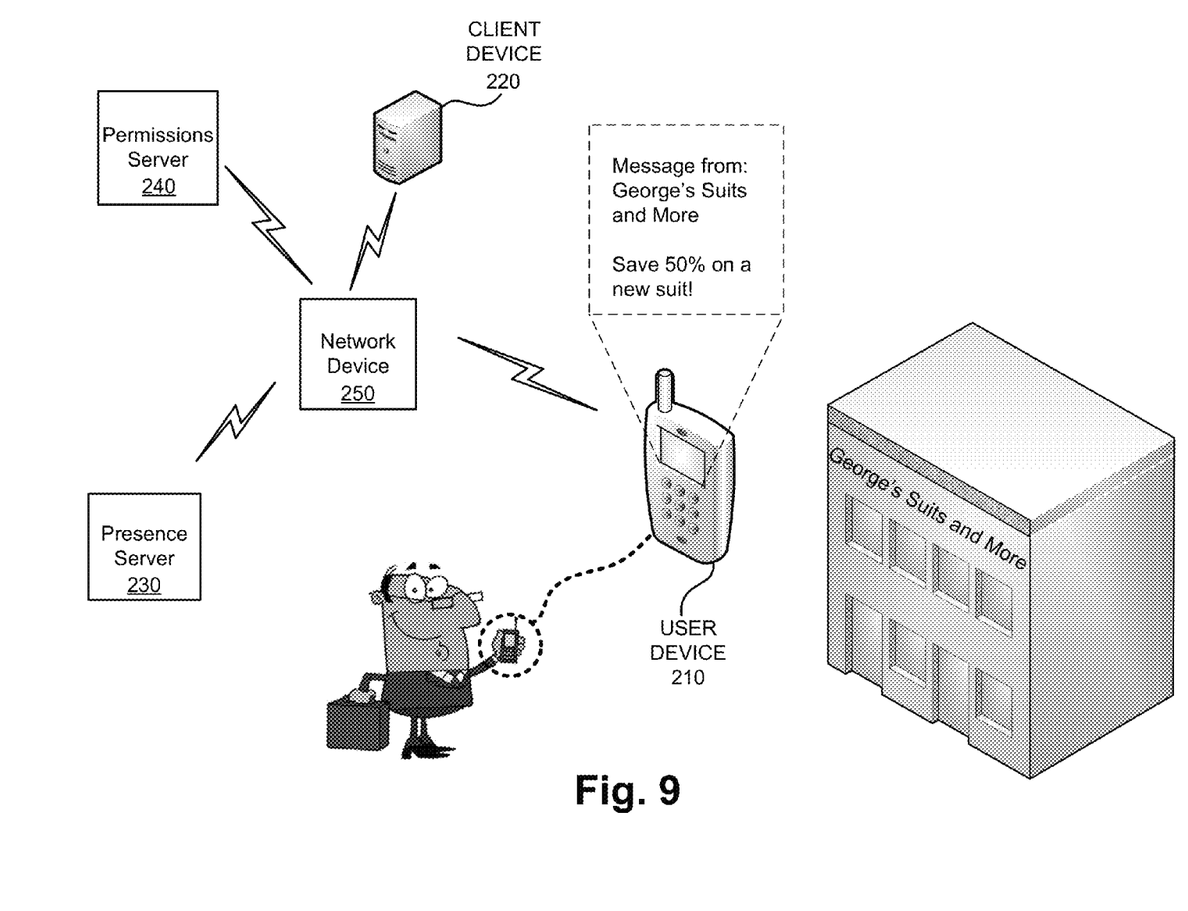
FIG. 9 illustrates an example implementation described herein.

FIG. 9 illustrates an example implementation described herein. In FIG. 9, assume that client device 220 is associated with a merchant, such as "George's Suites and More." Further assume that user device 210 enters a particular geographic location (e.g., a geographic location associated with the merchant) and that permissions stored by permissions server 240 allow presence status relating to the geographic location of user device 210 to be received by client device 220. In the example implementation shown in FIG. 9, client device 220 may automatically receive presence status for user device 210 relating to that user device 210 has entered a geographic location associated with the merchant. Additionally, or alternatively, client device 220 may send information, associated with the merchant, to user device 210, such as promotions and/or some other information.

Figure 10:
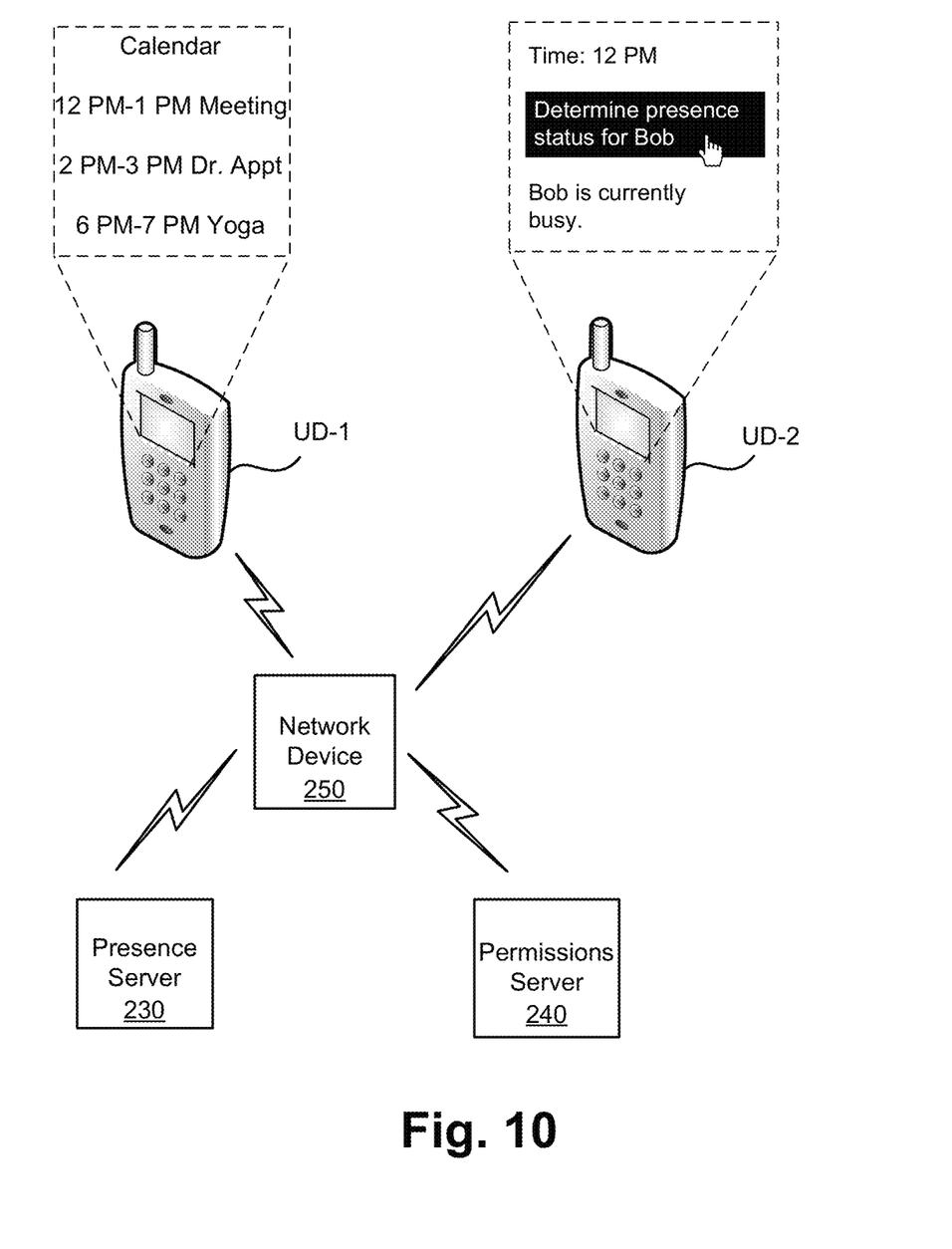
FIG. 10 illustrates an example implementation described herein.

FIG. 10 illustrates an example implementation described herein. In FIG. 10, assume that a first user device 210 (e.g., UD-1) includes a calendar application having a calendar entry for 12 PM (e.g., a calendar entry of "Meeting") and that UD-1 is associated with a user (e.g., "Bob"). Further assume that permissions server 240 stores information to permit a second user device 210 (e.g., UD-2) to receive presence information relating to when UD-1 is considered to be busy (e.g., is associated with a presence status type of "busy"). In some implementations, presence server 230 may identify the presence status of UD-1 as "busy" based on user analytics data associated with the calendar application of UD-1 (e.g., calendar entries of UD-1). UD-2 may receive presence status information for UD-1 (e.g., a presence status of "busy") based on requesting the presence status for UD-1 (e.g., via receiving a command from a user, associated with UD-2).

As described above, presence server 230 may receive user analytics data from user device 210 (e.g., via network device 250) and may identify a presence status, associated with user device 210, based on the user analytics data. Permissions server 240 may receive presence status categorized by presence status types and by user devices 210 (e.g., individual user devices 210 may be identified by user device identifiers, such as MDN and/or IMSI number, etc.) and may apply permissions to presence status information by presence status type to form advertised presence status information.

As described above, client device 220 and/or other user devices 210 may receive advertised presence status information based on the applied permissions and a user, associated with user device 210, may select permissions applied by permissions server 240 (e.g., a user, associated with UD-1 may apply permissions to allow UD-2 to receive presence status information while preventing some other devices from receiving presence status information). As a result, presence status of user device 210 is identified without user interaction, and presence status of user device 210 is transmitted such that only permitted devices may receive presence status information.

The foregoing description provides illustration and description, but is not intended to be exhaustive or to limit the possible implementations to the precise form disclosed. Modifications and variations are possible in light of the above disclosure or may be acquired from practice of the implementations. For example, while series of blocks have been described with regards to FIGS. 7-8, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first server device, data associated with a first user device,
   the first user device sending the data to the first server device via a network device without user interaction, and
   the data relating to user analytics associated with the first user device,
   the user analytics including:
   an identifier associated with the first user device,
   geographic information associated with the first user device, and
   call information associated with the first user device;
   determining, by the first server device and based on the data, a status associated with the first user device;
   storing, by the first server device, information regarding the status;
   receiving, by the first server device, permissions for the information regarding the status,
   the permissions for the information regarding the status being based on the identifier, the geographic information associated with the first user device, and the call information associated with the first user device, and the permissions including:
   a first permission, associated with the geographic information, indicating a first quantity of user devices, identified based on information received from the first user device, that are authorized to receive the geographic information, and
   a second permission, associated with the call information, indicating a second quantity of user devices, identified based on information received from the first user device, that are authorized to receive the call information;
   applying, by the first server device, the permissions for the information regarding the status to form an advertised status associated with the first user device; and
   sending, by the first server device, the advertised status to the network device,
   the network device being capable of sending the advertised status to a client device or a second user device based on the permissions for the information regarding the status, and
   the first user device, the second user device, and the client device being associated with different parties.

2. The method of claim 1, where the permissions for the information regarding the status include:
   an instruction to permit the transmission of the advertised status to an authorized device, and
   an instruction to prevent a transmission of the advertised status to a device which is not authorized.

3. The method of claim 1, where
   the information regarding the status includes a first status type and a second status type, and
   when applying the permissions for the information regarding the status, the method includes:
   applying permissions to the first status type and the second status type.

4. The method of claim 1, where the call information includes information associated with one of: an idle status, an on call status, or a busy status.

5. The method of claim 1, where the data relating to the user analytics associated with the first user device includes information relating to non-call activity being performed by the first user device.

6. The method of claim 1, where the data relating to the user analytics associated with the first user device includes information relating to calendar event data associated with the first user device.

7. The method of claim 1, where the advertised status is based on the geographic information associated with the first user device, and
   the advertised status includes information of a merchant that is associated with the geographic information associated with the first user device.

8. A system comprising:
   a first server device to:

receive data associated with a first user device,
the first user device sending the data to the first server device via a network device without user interaction, and
the data relating to user analytics associated with the first user device,
the user analytics including:
an identifier associated with the first user device, geographic information associated with the first user device, and call information associated with the first user device;
determine, based on the data, a status associated with the first user device;
store information regarding the status;
receive permissions for the information regarding the status of the first user device,
the permissions for the information regarding the status of the first user device being based on the identifier, the geographic information associated with the first user device, and the call information associated with the first user device, and the permissions including:
a first permission, associated with the geographic information, indicating a first quantity of user devices, identified based on information received from the first user device, that are authorized to receive the geographic information, and
a second permission, associated with the call information, indicating a second quantity of user devices, identified based on information received from the first user device, that are authorized to receive the call information;
apply the permissions for the information regarding the status to form an advertised status associated with the first user device; and
send the advertised status to the network device, the network device being capable of sending the advertised status to a client device or a second user device based on the permissions for the information regarding the status.

9. The system of claim 8, where the permissions for the information regarding the status include:
an instruction to permit transmission of the advertised status to an authorized device, and
an instruction to prevent transmission of the advertised status to a device which is not authorized.

10. The system of claim 8, where the information regarding the status includes a first status type and a second status type, and
when applying the permissions for the information regarding the status, the first server device is further to:
apply permissions to the first status type and the second status type.

11. The system of claim 8, where the first user device, the second user device, and the client device are associated with different parties.

12. The system of claim 8, where the call information includes information associated with one of: an idle status, an on call status, or a busy status.

13. The system of claim 8, where the data relating to the user analytics associated with the first user device includes information relating to non-call activity being performed by the first user device.

14. The system of claim 8, where the data relating to the user analytics associated with the first user device includes information relating to calendar event data associated with the first user device.

15. The system of claim 8, where the advertised status is based on the geographic information associated with the first user device, and
the advertised status includes information of a merchant that is associated with the geographic information associated with the first user device.

16. A non-transitory computer-readable medium storing instructions, the instructions comprising:
a plurality of instructions, which, when executed by one or more processors associated with a first server device, cause the one or more processors to:
receive data associated with a first user device,
the first user device sending the data to the first server device via a network device without user interaction, and
the data relating to user analytics associated with the first user device, the user analytics including:
an identifier associated with the first user device, geographic information associated with the first user device, and call information associated with the first user device;
determine, based on the data, status associated with the first user device;
store information regarding the status;
receive permissions for the information regarding the status of the first user device,
the permissions for the information regarding the status of the first user device being based on the identifier, the geographic information associated with the first user device, and the call information associated with the first user device, and
the permissions including:
a first permission, associated with the geographic information, indicating a first quantity of user devices, identified based on information received from the first user device, that are authorized to receive the geographic information, and
a second permission, associated with the call information, indicating a second quantity of user devices, identified based on information received from the first user device, that are authorized to receive the call information;
apply the permissions for the information regarding the status to form an advertised status associated with the first user device; and
send the advertised status to the network device, the network device being capable of sending the advertised status to a client device or a second user device based on the permissions,
and the permissions for the information regarding the status include an instruction to permit a transmission of the advertised status to an authorized device and to prevent the transmission of the advertised status to a device which is not authorized.

17. The non-transitory computer-readable medium of claim 16, where
the information regarding the status includes a first status type and a second status type, and
the one or more instructions, of the plurality of instructions, to apply the permissions for the information regarding the status include:
one or more instructions to apply permissions to the first status type and the second status type.

18. The non-transitory computer-readable medium of claim 16, where the first user device, the second user device, and the client device are associated with different parties.

19. The non-transitory computer-readable medium of claim 16, where the call information includes information associated with one of: an idle status, an on call status, or a busy status.

20. The non-transitory computer-readable medium of claim 16, where the data relating to the user analytics associated with the first user device includes information relating to non-call activity being performed by the first user device.

21. The non-transitory computer-readable medium of claim 16, where the advertised status is based on the geographic information associated with the first user device, and
the advertised status includes information of a merchant that is associated with the geographic information associated with the first user device.

\* \* \* \* \*